3,254,069
**PREPARATION OF HIGH CIS-1,4 POLY-
BUTADIENE**
Paul H. Johnson, Akron, Ohio, assignor to The Firestone
Tire & Rubber Company, Akron, Ohio, a corporation
of Ohio
No Drawing. Filed Feb. 27, 1961, Ser. No. 91,588
9 Claims. (Cl. 260—94.3)

This invention relates to the polymerization of butadiene. More specifically the invention relates to the production of butadiene polymers in which at least fifty percent of the polymeric butadiene units are present in the cis-1,4 configuration.

Butadiene, the simplest and most available of the conjugated dienes, has served as the basis of an extensive technology for the preparation of polymers designed to serve the functions of Hevea rubber. The polymers of butadiene heretofore produced, while useful as practical substitutes for Hevea rubber in many applications, nevertheless fail to match natural rubber in many properties, notably internal friction and resilience. It appears that such deficiencies result from the irregular configurations in which the butadiene units enter the polymers heretofore prepared therefrom, and that greatly superior products would result if greater proportions of the butadiene units entered the polymeric chain in the cis-1,4 configuration. The cis-1,4 configuration, is homologous to the structure of Hevea rubber, and hence cis-1,4 polymers exhibit properties superior to those of the random butadiene polymers heretofore produced.

Accordingly, it is the primary object of the invention to provide a method for the production of butadiene polymers which are characterized by superior properties.

It is an additional objective of the invention to provide a method for the production of butadiene polymers in which the polymeric butadiene units are predominantly present in the cis-1,4 configuration.

In accordance with the invention, butadiene is polymerized in contact with a composite catalyst consisting essentially of titanium tetraiodide and a polymethylene dilithium compound, the carbon-bound lithium to titanium tetraiodide mol ratio in said catalyst being not greater than about three to one, to produce a butadiene polymer in which at least 50% of the polymeric butadiene units are present in the cis-1,4 configuration.

The preferred polymethylene dilithium compounds contemplated as catalysts by the invention include all such compounds having from about two to about ten carbon atoms. Specifically dimethylene dilithium, diethylene dilithium, tetramethylene dilithium, pentamethylene dilithium, hexamethylene dilithium, heptamethylene dilithium, octamethylene dilithium, nonamethylene dilithium, and decamethylene dilithium are contemplated.

The polymethylene dilithium catalysts of the invention are unique in the production of butadiene polymers characterized by a high cis-1,4 structure. Other organolithium catalysts such as butyl lithium and biphenyl dilithium yield butadiene polymers characterized by a low percentage of cis-1,4 configuration and undesirably high percentage of trans-1,4 and 1,2 configuration.

The catalyst components may be mixed and brought into contact with butadiene in any desired order. More specifically, the two catalyst components may be combined in an inert solvent to provide a catalyst solution or suspension for convenient handling. Suitable solvents include any of the various hydrocarbons containing up to 40 carbon atoms such as the paraffins including propane, butane, hexane, pentane eicosane, petroleum ether, gasoline, diesel oil and the like, and aromatic hydrocarbons such as benzene, toluene and xylene. Hydrocarbons containing not more than 16 carbon atoms are preferred.

Alternatively either of the two catalyst components may first be placed in contact with the butadiene to be polymerized and the additional catalyst component thereafter added. The addition of the second catalyst component in such case, however, should be promptly effected to preclude the formation of any significant quantity of butadiene polymer of undesirable microstructure.

In the preferred practice of the invention, the catalyst is prepared by introducing the polymethylene dilithium catalyst component maintained in an atmosphere of an inert gas, such as argon, into a polymerization vessel containing the desired solvent. The titanium tetraiodide is thereafter added preferably in the form of a fine powder. The catalyst is appropriately aged prior to utilization. Aging by standing at a temperature for example of from about 20° C. to 50° C. for a period at least about twenty-four hours is appropriate.

If the mol ratio of carbon-bound lithium to titanium tetraiodide substantially exceeds about three to one, the percentage of cis-1,4 structure in the resulting polymer decreases to an undesirably low level, while the percentage of trans-1,4 and 1,2 structure increases. Preferred catalyst compositions are characterized by a carbon-bound lithium to titanium tetraiodide mol ratio of from about 0.5 to 1 to about 2.5 to 1.

The catalyst concentration is not critical and may be substantially varied by those skilled in the art. In general from about six to about twenty millimoles of catalyst per one hundred parts of butadiene is appropriate. A preferred range is from about ten to about fourteen total millimoles of catalyst per one hundred parts of butadiene.

The polymerization system should be free of moisture, elemental oxygen, and of oxygen and nitrogen compounds which react with a polymethylene dilithium compound. Examples of such compounds to be excluded are ordinary ether, tetrahydrofuran, ammonia and amines. Any liquid, inert hydrocarbon solvent can be used. For economic reasons and for convenience it is generally desirable to use saturated nonaromatic solvents, such as petroleum ether, butane, pentane, hexane, heptane, octane, gasoline, cyclohexane, or mixtures of any of these solvents. The process of the invention produces gel-free rubbery polymers, whether one uses any of the preferred group of solvents or an inert aromatic solvent such as benzene or a mixture of solvents. Any convenient proportion of solvent can be employed. Preferably enough solvent is used so that a cement of the desired rubber is obtained at the conclusion of the polymerization. For example, one part solvent to one part total monomer represents a concentrated solution, and 100 parts solvent to one part total monomer represents a dilute solution. More commonly, one uses sufficient solvent to provide a final cement containing 5 to 30 parts of rubbery polymer.

The monomers employed in the invention are preferably quite pure and dry, and are substantially free of any impurity, such as an alpha acetylene, which reacts more rapidly with a polymethylene dilithium than does butadiene. Pure butadiene can be copolymerized with isoprene in accordance with the invention in any proportion, but preferably in the range of 50% to 99% of the total monomers. A hydrocarbon vinyl monomer can be copolymerized or interpolymerized with a major proportion of either butadiene or mixture of isoprene and butadiene. Typical vinyl monomers contemplated for use in the invention are styrene, alpha-methylstyrene, a vinyl toluene, propylene and ethylene.

The temperature of polymerization can be varied over a wide range, for example, from −50° C. to 150° C. The polymerization pressure can also be widely varied, but normally will range betwen one atmosphere and several atmospheres, no especial advantage being realized at high pressures. When operating at higher polymerization temperatures it is appropriate to maintain the pressure high enough to insure that substantially all monomer and solvent are in the liquid phase.

The polymer can be recovered in conventional manner. More specifically, if the polymerization reaction has been effected in a hydrocarbon solvent, the resultant solution can appropriately be mixed with methylethyl ketone, methanol, isopropanol or other non-solvent for the polymer to effect coagulation and precipitation of the polymer. The precipitated product can be milled, calendered, extruded, and otherwise processed upon conventional rubber processing machinery. Conventional antioxidants, pigments, stabilizers and the like can be added.

The polymer may also be recovered by evaporating the solvent, for instance, by injection into hot water or by passage through a heated extruder, a drum drier, or similar apparatus.

The butadiene polymer produced in accordance with this invention contains polymeric butadiene units at least 50% of which are present in the cis-1,4 configuration. In the preferred method of the invention proper catalyst compositions and concentrations are utilized so that the polymeric butadienes of the invention are characterized by 70% or more cis-1,4 configuration. The microstructure of the polymeric butadienes of the invention is reflected by the rubbery properties of the polymers which yield vulcanizates of relatively low internal friction, and improved tensile strength as compared with polybutadienes containing a significantly lower cis-1,4 content.

The microstructure of the butadiene polymers is determined in conformity with the technique described in J. L. Binder, Analytical Chemistry, volume 26, page 1877 (1954).

EXAMPLE I

Butadiene was polymerized in a series of experiments in contact with a catalyst formed from tetramethylene dilithium and titanium tetraiodide in which the mol ratio of carbon-bound lithium to titanium tetraiodide was two to one. The results are reflected by Table I.

The catalyst was prepared by ball milling for about sixteen hours 72.6 milliliters of a tetramethylene dilithium suspension in an inert solvent and 22.2 grams of titanium tetraiodide in 127.4 grams of hexane. A suitable volume of the catalyst mixture was used for each polymerization to provide the 12 millimoles recorded in Table I.

The butadiene was purified with tall oil soap and cuprous chloride and distilled. The purified butadiene was mixed with the solvent indicated in Table I to provide a solution containing fifteen percent by weight butadiene.

All polymerizations were effected at a temperature of about 50° C.

Table I

| | | | | |
|---|---|---|---|---|
| Benzene (grs.) | 566 | | 284 | 56.6 |
| Hexane (grs.) | | 566 | 284 | 509.4 |
| Butadiene (grs.) | 100 | 100 | 100 | 100 |
| Conversion at 20 hrs. | 100 | 72 | 90.6 | 74.8 |
| Millimoles of Total Catalyst | 12 | 12 | 12 | 12 |
| Percent Cis 1, 4 | 89.7 | 84.7 | 86.3 | 85.4 |
| Percent Trans. 1, 4 | 5.3 | 6.3 | 6.5 | 7.0 |
| Percent 1, 2 | 5.0 | 9.0 | 7.2 | 7.6 |
| Total Found | 78.0 | 76.5 | 75.8 | 76.4 |
| Gel, Percent | 1.5 | 5.56 | 1.0 | 2.25 |
| Inh. Visc. | 10.9 | 3.93 | 4.61 | 3.16 |

Comparable results are obtained when dimethylene dilithium, trimethylene dilithium, pentamethylene dilithium, hexamethylene dilithium, heptamethylene dilithium, octamethylene dilithium, nonamethylene dilithium and decamethylene dilithium are utilized as catalysts in the foregoing experiments.

EXAMPLE II 75 grams of butadiene was polymerized at 50° in 175 milliliters of n-hexane in the presence of a catalyst formed of titanium tetraiodide and pentamethylene dilithium in which the mol ratio of carbon bound lithium to titanium tetraiodide was 2.5 to one.

The catalyst was prepared by introducing pentamethylene dilithium under a stream of argon into a polymerization bottle containing a portion of the hexane solvent. The bottle containing the alkyl lithium solution was capped, placed in a dry box, uncapped to permit the addition of the titanium tetraiodide in the form of a fine powder, and recapped. The resulting catalyst solution was aged at least twenty four hours at 25° C. The contents were withdrawn with a hypodermic syringe for use as a catalyst which was utilized in an amount required to provide 10 millimoles of lithium and 4 millimoles of titanium tetraiodide.

The butadiene was employed in the form of a fifteen weight percent solution in hexane.

Infra-red analysis of the polymer indicated 72.8% cis-1,4; 14.5% trans-1,4; and 12.8% 1,2 configuration, the total unsaturation found being 52.3%.

In an identical experiment in which the titanium tetraiodide component of the catalyst was omitted, infra-red analysis of the resulting polymer indicated 27.9% cis-1,4; 61.7% trans-1,4 and 10.7% 1,2 configuration, the total unsaturation found being 83.9%.

Results comparable to those described in reference to Examples I and II are also obtained when butadiene is copolymerized with isoprene or a hydrocarbon vinyl monomer. Comparable results are likewise obtained when the mol ratio of carbon-bound lithium to titanium tetraiodide in the catalyst employed is varied within the range of from about 0.5 to 1 to about 3 to 1.

The process of the invention provides butadiene polymers of excellent properties useful, inter alia, in the manufacture of tires, shaped rubber articles, adhesives and the like pursuant to techniques known to those skilled in such arts.

I claim:

1. The process which comprises contacting butadiene with a catalyst formed essentially from titanium tetraiodide and a polymethylene dilithium compound the carbon-bound lithium to titanium tetraiodide mol ratio in said catalyst being no greater than about three to one to produce a rubbery butadiene polymer in which at least 50% of the polymeric butadiene units are present in the cis-1,4 configuration.

2. The process which comprises contacting butadiene with a catalyst formed essentially from titanium tetraiodide and a polymethylene dilithium compound containing from two to about ten carbon atoms the carbon-bound lithium to titanium tetraiodide mol ratio in said catalyst being no greater than about three to one to produce a rubbery butadiene polymer in which at least 50% of the polymeric butadiene units are present in the cis-1,4 configuration.

3. The process of claim 2 wherein said polymethylene dilithium compound is tetramethylene dilithium.

4. The process of claim 2 wherein said polymethylene dilithium compound is pentamethylene dilithium.

5. The process of claim 2 wherein the carbon-bound lithium to titanium tetraiodide mol ratio in said catalyst is from about 0.5 to 1 to about 2.5 to 1.

6. The process of claim 2 wherein from about 6 to about 20 total millimoles of catalyst per 100 parts by weight of butadiene are utilized.

7. The process of claim 2 wherein from about 10 to about 14 total millimoles of catalyst per 100 parts by weight of butadiene are utilized.

8. The process of claim 2 wherein said butadiene is homopolymerized.

9. A process which comprises contacting butadiene with a catalyst formed essentially of titanium tetraiodide and a compound selected from the group consisting of tetramethylene dilithium and pentamethylene dilithium, the carbon-bound lithium to titanium tetraiodide mol ratio in said catalyst falling within the range of from about 0.5 to 1 to about 2.5 to 1, said catalyst in an amount requisite to provide from about 6 to about 20 total millimoles thereof per 100 parts by weight of butadiene to produce a rubbery butadiene polymer in which at least 50% of the polymeric butadiene units are present in the cis-1,4 configuration.

References Cited by the Examiner

UNITED STATES PATENTS

| | | | |
|---|---|---|---|
| 2,962,488 | 11/1960 | Horne | 260—94.7 |
| 3,004,018 | 10/1961 | Naylor | 260—94.3 |
| 3,014,017 | 12/1961 | Raum | 260—93.7 |
| 3,036,056 | 5/1962 | Rion | 260—94.3 |

FOREIGN PATENTS

| | | |
|---|---|---|
| 215,043 | 11/1956 | Australia. |
| 551,851 | 4/1957 | Belgium. |
| 841,527 | 7/1960 | Great Britain. |

JOSEPH L. SCHOFER, *Primary Examiner.*

LESLIE H. GASTON, *Examiner.*

M. A. GANNON, E. J. SMITH, *Assistant Examiners.*

UNITED STATES PATENT OFFICE
CERTIFICATE OF CORRECTION

Patent No. 3,254,069　　　　　　　　　　　　　　　May 31, 1966

Paul H. Johnson

It is hereby certified that error appears in the above numbered patent requiring correction and that the said Letters Patent should read as corrected below.

Column 1, line 69, for "pentane" read -- pentane, --; column 4, line 23, for "61.7%" read -- 61.4% --.

Signed and sealed this 26th day of September 1967.

(SEAL)
Attest:

ERNEST W. SWIDER　　　　　　　　　　　　　　　EDWARD J. BRENNER
Attesting Officer　　　　　　　　　　　　　　　　　Commissioner of Patents